United States Patent [19]

Blessing

[11] 4,133,217

[45] Jan. 9, 1979

[54] INTERMITTENT DRIVE AND TRANSFER MECHANISM

[75] Inventor: Hubert Blessing, Dallas, Tex.

[73] Assignee: Levi Strauss & Co., San Francisco, Calif.

[21] Appl. No.: 654,705

[22] Filed: Feb. 2, 1976

[51] Int. Cl.² ............................ F16H 33/06; F16H 35/08
[52] U.S. Cl. ......................................................... 74/395
[58] Field of Search ................. 74/395, 217 S, 217 C, 74/393, 397, 395, 217 R, 216.5

[56] References Cited

U.S. PATENT DOCUMENTS

| | | | |
|---|---|---|---|
| 2,106,918 | 2/1938 | Perazzoli | 74/397 X |
| 3,166,947 | 1/1965 | Hendershot | 74/395 X |
| 3,393,754 | 7/1968 | Hachemeister | 74/216.5 X |
| 3,906,810 | 9/1975 | Glendening | 74/395 |

*Primary Examiner*—Leonard H. Gerin
*Attorney, Agent, or Firm*—Limbach, Limbach & Sutton

[57] ABSTRACT

Constant rotation from a motor is converted into cyclical rotation for a transfer assembly by means of a drive mechanism having a continuous chain threaded around four sprocket gears arranged in a rectangular configuration with a second set of idler gears mounted on a movable block taking up the slack in the chain on two sides of the rectangular configuration. The movable block and idler gears are moved to and fro by the action of a pivoted cam follower which is reciprocated by a cam mounted on the driving shaft of one of the sprocket gears. Constant rotational power is supplied to the mounting shaft of one of the four main sprocket gears and cyclical rotation is taken out on the mounting shaft of the second one of the four main sprocket gears which is located on the opposite side of the driving chain slack from the driving sprocket gear. In the preferred embodiment the cyclical output is used to drive a carriage transfer mechanism having a carriage mounted on a pair of slidable bars and driven by a continuous chain mounted around a pair of sprocket gears at opposite ends of the bars. The carriage is attached to the driving sprocket chain of the carriage transfer mechanism by means which produce only tension on the chain and virtually no lateral forces on the carriage transfer mechanism structure.

3 Claims, 19 Drawing Figures

INTERMITTENT DRIVE AND TRANSFER MECHANISM

BACKGROUND OF THE INVENTION

The present invention relates to an intermittent drive assembly, and more particularly to an intermittent drive assembly for driving a transfer carriage in a garment assembly device.

The steps of producing a portion of garment, such as a garment pocket, involve a series of separate operations which have traditionally been done by hand since automatic handling of fabric is extremely difficult because of the pliability of the fabric. This makes garment fabrication a labor intensive product and thus quite expensive.

Recently attempts have been made to manufacture separate garment fabrication component assemblies which can be combined together in an overall garment fabrication assembly. A necessary and integral part of such an overall assembly is means for transferring the fabric workpieces from one assembly stage to the next automatically. Because the machine components must all work in a timed interrelationship this requires relatively high accelerations in the transfer mechanism in moving from one station to the next. To undertake this using an electric motor which is suddenly accelerated and decelerated is not feasible because of the large inertia and the high inductive currents which are thereby produced. A second problem is the mechanical stress on the gear indexing mechanisms which must rapidly accelerate and decelerate with a consequent wear and tear due to such drastic changes in momentum. This is true even where the transfer mechanisms are pneumatically operated. It is thus desirable to have a transfer mechanism which produces little wear and tear on the carriage and the carriage support and which may be driven by a constant speed motor to produce a reciprocating linear motion.

SUMMARY OF THE INVENTION

The above and other disadvantages of prior art devices are overcome by the present invention of an intermittent drive assembly comprising first, second, third and fourth rotative members, means for separately mounting the first, second, third and fourth rotative members in a spaced apart relationship, an endless flexible drive member trained around the first, second, third and fourth rotative members in a manner such that the flexible drive member passes from the first, to the second, to the third, and to the fourth rotative members in that order, with slack loops in the flexible drive member between the first and second rotative members and the third and fourth rotative members, movable idler means for controlling the length of the slack loops in the endless drive member between the first and second rotative members and the third and fourth rotative members in an inverse fashion, such that when the slack in the loop between the first and second rotative members is increased the slack between the third and fourth rotative members is decreased, and vice versa. Means are provided for moving the movable idler members for controlling the length of the respective loops of slack in the endless drive member. The rotative support for one of the first or fourth rotative members constitutes a driving input and the rotative support for one of the second or third rotative members consitutes the driving output of the assembly.

In the preferred embodiment the members for controlling the loops of slack in the endless driving member comprise a pair of idler pulleys mounted on a movable block whose transverse movement is controlled by a cam mounted on the input driving shaft. The endless drive member is a sprocket chain and the rotative members are sprocket gears. By this means a constant rotating driving motion supplied on the input driving shaft is converted to a cyclic motion at the output driving shaft on which one of the sprocket gears is mounted. In this manner the necessity for constantly starting and stopping an electric motor or other type of motion imparting device is obviated and a constant driving speed may be utilized.

While the intermittent drive assembly of the present invention has numerous applications, in one particular application it is utilized to drive a carriage for an improved transfer device in a garment assembly machine according to the invention. The transfer device according to the invention includes a carriage member which rides on a pair of parallel, spaced apart rails. A driving chain located between the rails is trained around a pair of spaced apart sprocket gears rotatably mounted at opposite ends of the rails. One of the sprocket gears is driven by the intermittent drive assembly. The carriage is connected to one end of a pair of pivoted connecting bars. An equilateral, triangular member has one of its vertices pivotably connected to the driving chain and its other two vertices connected to the unpivoted ends of the separate connecting bars. By this mechanism the carriage is made to follow the action of the chain but the only stresses introduced on the chain are substantially only in the direction of travel of the driving chain.

It is therefore an object of the present invention to provide an intermittent drive assembly for converting a constant rotational force into a cyclicly rotating force for use in a garment manufacturing device;

It is another object of the invention to provide an intermittent drive assembly for converting a constant rotational force into a cyclic rotational force with a minimal amount of inertial forces;

It is still another object of the invention to provide an intermittent drive assembly for driving a materials handling transfer mechanism in a garment manufacturing device;

It is yet another object of the invention to provide an intermittently driven transfer mechanism which introduces no forces on its flexible driving components other than in their direction of travel.

The foregoing and other objectives, features and advantages of the invention will be more readily understood upon consideration of the following detailed description of certain preferred embodiments of the invention, taken in conjunction with the accompanying drawings.

DETAILED DESCRIPTION OF CERTAIN PREFERRED EMBODIMENTS

Figures 1, 2:
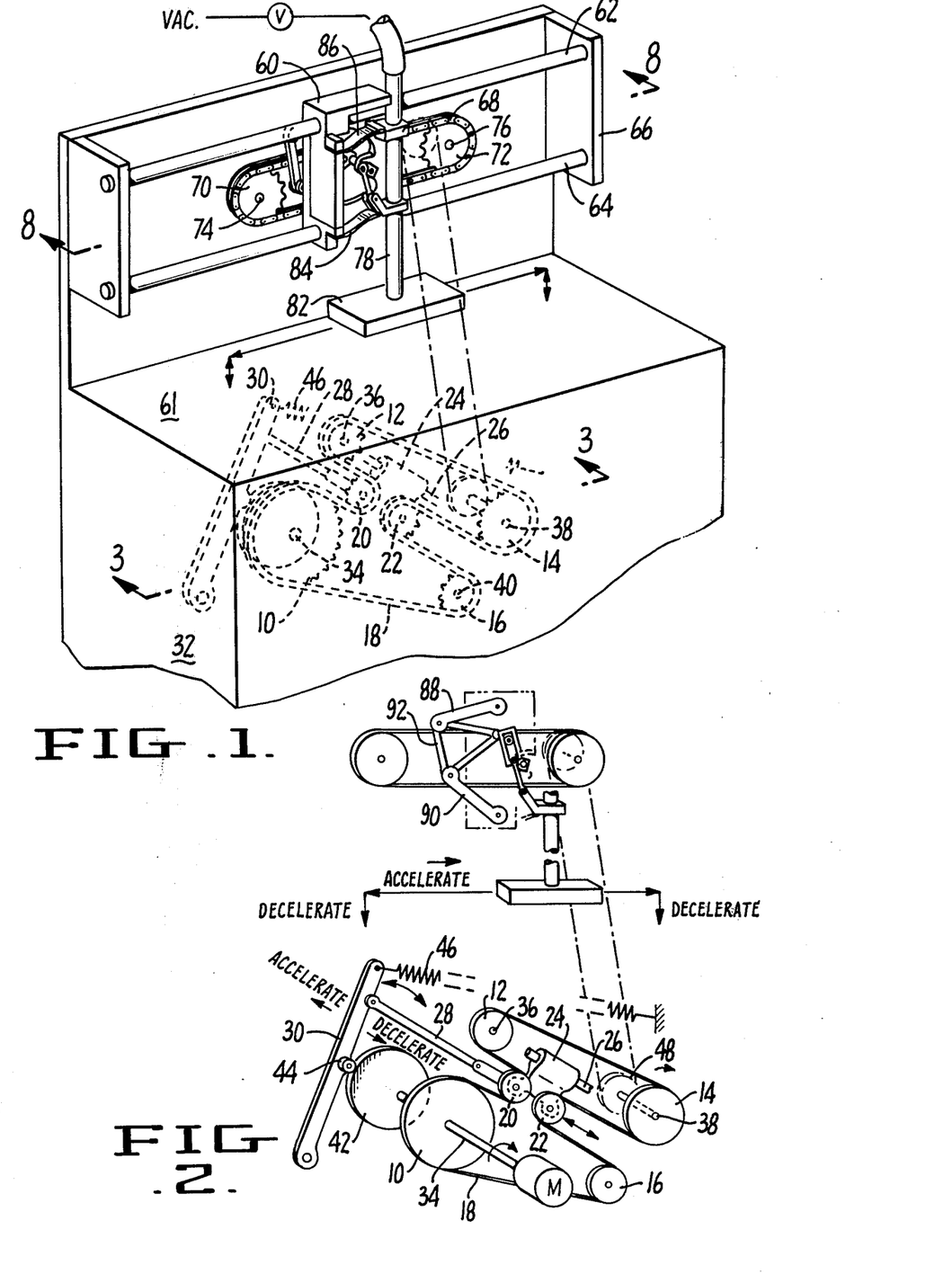
FIG. 1 is a perspective view, with portions broken away, and in hidden line fashion, of an intermittent drive assembly and a carriage transfer mechanism according to the invention.
FIG. 2 is a diagrammatic view of the mechanism depicted in FIG. 1 for illustrating the operation of the mechanism of the invention.

Referring now more particularly to FIGS. 1 and 2, the intermittent drive assembly and the carriage transfer mechanism according to the invention are illustrated. The intermittent drive assembly includes a first sprocket gear 10, a second sprocket gear 12, a third sprocket gear 14 and a fourth sprocket gear 16 arranged in a rectangular configuration and with a driving chain 18 trained around the four sprocket gears. The sprocket chain 18 includes slack loops between the sprocket gears 10 and 12 and 14 and 16 and these slack loops are taken up by a pair of sprocket gears 20 and 22 rotatably mounted on a block 24 which is slidably mounted on a bar 26. A connecting link 28 is pivoted at one end to the block 24 and at the other end to one end of a cam follower lever 30. The other end of the cam follower level 30 is pivoted to a housing 32 (see FIG. 3). The sprocket gears 10, 12, 14 and 16 are rotatably mounted on independent, parallel shafts 34, 36, 38 and 40, respectively. As can be better seen in FIG. 6, the sprocket gears are actually double sprocket gears and the same reference numerals primed have been given to the second set of gears. A second chain 18' is also trained about these sprocket gears. The sliding block is situated between the two sets of sprocket gears and driving chains.

Between the sprocket gears 10 and 10' is mounted a cam 42 on the same shaft 34 as are mounted the sprocket gears 10 and 10'. The cam follower lever 30 includes a roller 44 which is biased to ride against the exterior contour of the cam 42 by means of a tension spring 46 connected between the unpivoted end of the follower lever 30 and the housing 32.

In operation, a motor M drives the shaft 34 which turns the sprocket gear 10 in the cam 42. This causes the driving chain 18 to be rotated about the sprocket gears 10, 12, 14 and 16 as well as the slack controlling sprocket gears 20 and 22. As can be best visualized in FIGS. 2, 3 and 4, at one angular orientation of the cam 42 the lever arm 30 moves the sliding block 24 to the left as viewed in FIGS. 2-4. The slack in the driving chain 18 existing between the sprocket gears 14 and 16 will be taken up, thereby causing the driving chain 18 passing around the sprocket gear 14 to move at a faster linear rate than the driving chain portion which passes around the sprocket gear 10. An output gear 48 is mounted on the shaft 38 of the sprocket gear 14. By moving the block 26 to the left as viewed in FIGS. 2-4 the consequent effect is to accelerate the rotational speed of the output gear 48. Conversely, if the lever arm 30 is moved to the right, as viewed in FIGS. 2-4, by virtue of the cam follower member 44 on the cam 42, the slack in the driving chain 18 between the sprocket gears 10 and 12 will be taken up and the slack in the driving chain 18 between the sprocket gears 14 and 16 will be let out. The consequent effect of this action is to cause the portion of the driving chain 18 passing around the sprocket gear 14 to travel at a slower linear speed than the portion of the driving chain 18 which passes around the sprocket gear 10. The operative effect of this is to retard the rotational speed of the output gear 48 and, in the embodiment for use with the carriage transfer mechanism depicted in FIG. 1, the output gear 48 actually goes through a dwell period, where its rotational speed stops altogether. As will be explained further hereinafter, this dwell period corresponds to the end travel of the carriage transfer mechanism.

It should be apparent that in other embodiments, by merely changing the shape of the cam 42, the output gear 48 may be caused to accelerate in the same rotational direction as the driving gear 10, to decelerate, pass through a period of dwell, and then rotate in the reverse direction with reference to the direction of rotational travel of the sprocket gear 10. The cycle would then pass through another dwell period and begin again. The shape of such a cam to cause various cycles of rotation of the output gear 48 is well within the skill of the art and thus will not be discussed in further detail here.

Figure 3:
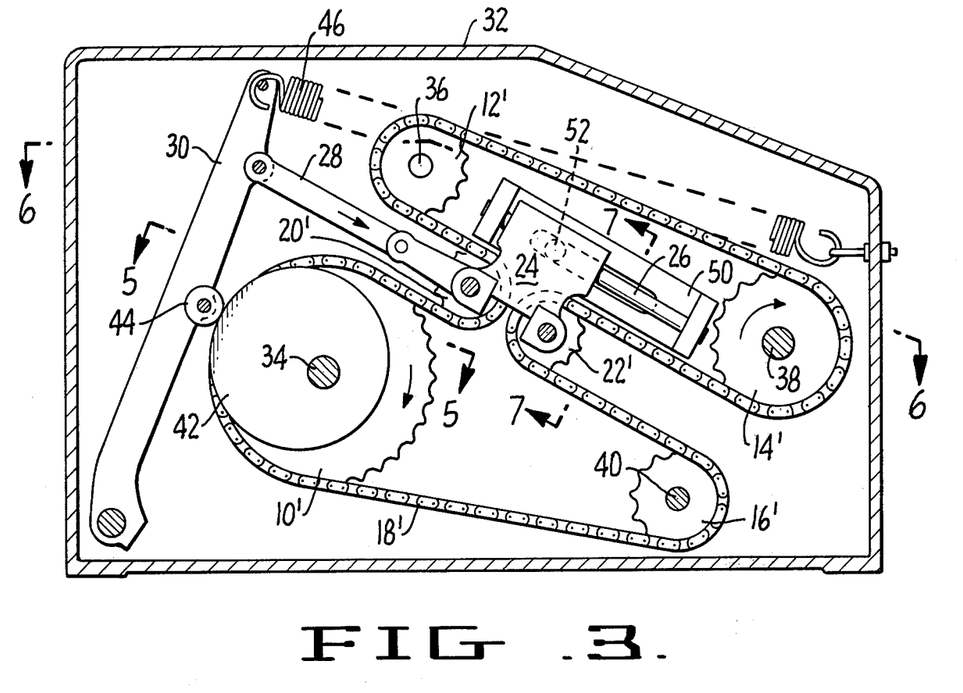
FIG. 3 is an enlarged vertical view, in section, taken generally along the lines 3—3 of FIG. 1.
Figure 4:
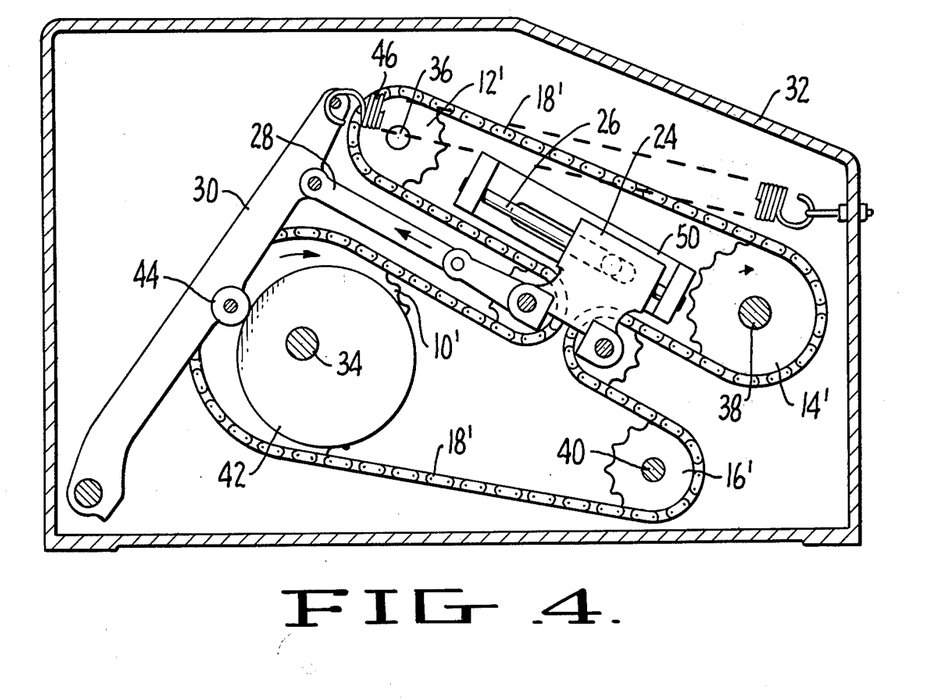
FIG. 4 is an enlarged vertical view, in section, corresponding to the view of FIG. 3 taken at a different point during the cyclical operation of the device.
Figure 5:
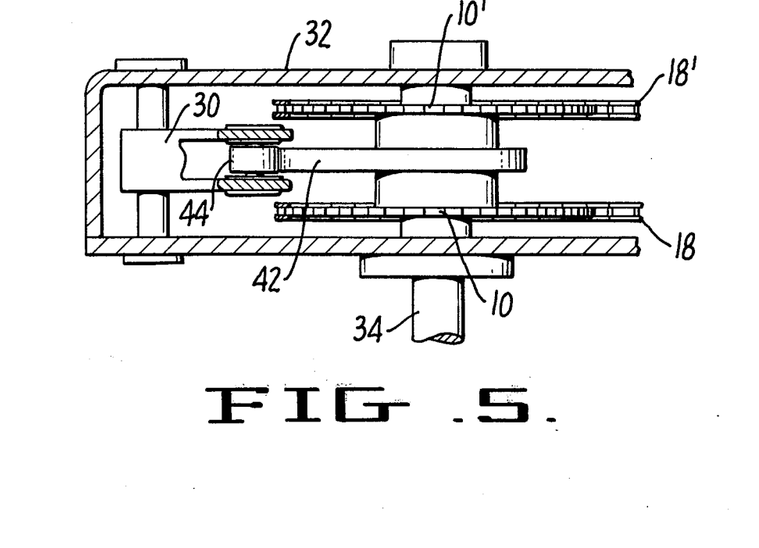
FIG. 5 is an enlarged sectional view, with portions broken away, taken generally along the lines 5—5 of FIG. 3.
Figure 6:
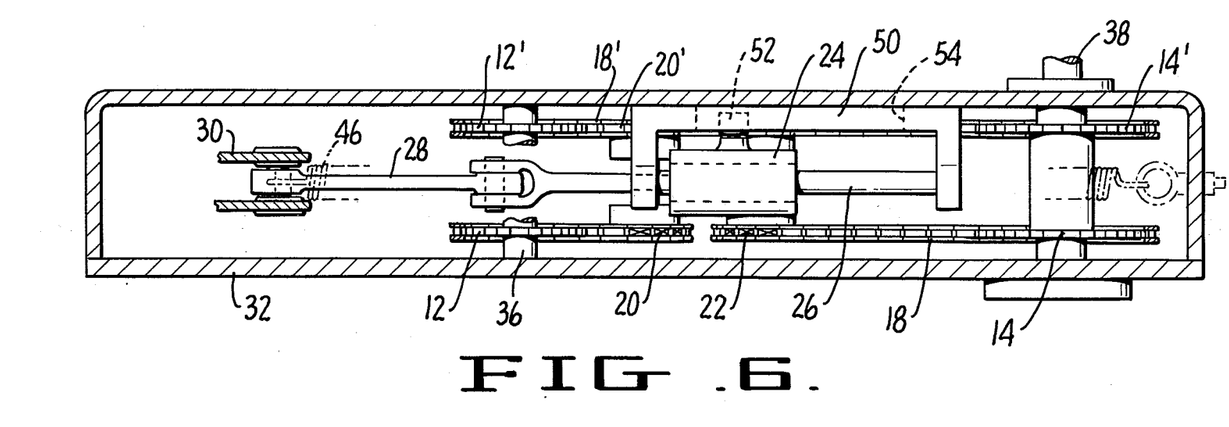
FIG. 6 is an enlarged sectional view, with portions broken away, taken generally along the lines 6—6 of FIG. 3.
Figure 7:
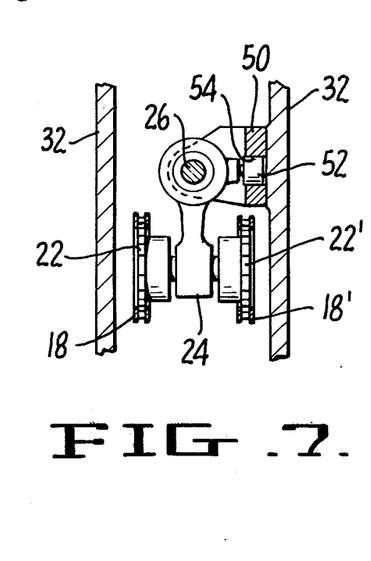
FIG. 7 is an enlarged sectional view, with portions broken away, taken generally along the lines 7—7 of FIG. 3.

As can best be seen in FIGS. 3, 6 and 7, the sliding block 24 and bar 26 are mounted in a C-shaped bracket 50 between the short legs of the C. The long side of the bracket 50 is attached to one side of the housing 32. The sliding block 24 includes a projecting roller member 52 which is contained within a slot 54 in the long side of the bracket 50. This prevents the block 24 from rotating about the shaft 26. In this respect, the double set of chains 18 and 18' also help to balance the torques exerted on the shafts of the respective sprocket gears. From FIG. 6 it can be seen that the driving chain 18 and the sprocket gears 10, 12, 14 and 16, as well as the gears 20 and 22, are all in the same vertical plane with the supporting shafts being parallel to each other. Similarly the sprocket gears 10', 12', 14' and 16' and the driving chain 18' are all in a second common plane which is parallel to the plane containing the driving chain 18.

Figure 8:
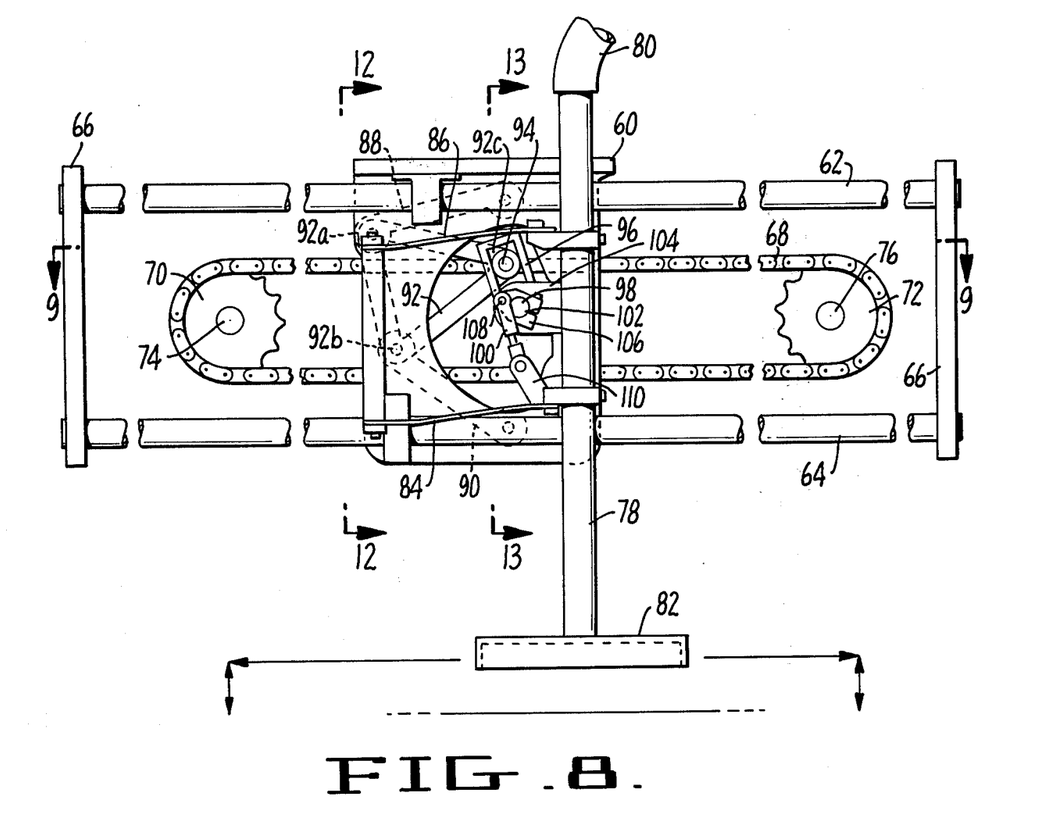
FIG. 8 is a vertical view, with portions broken away, of the carriage transfer mechanism according to the invention.
Figure 9:
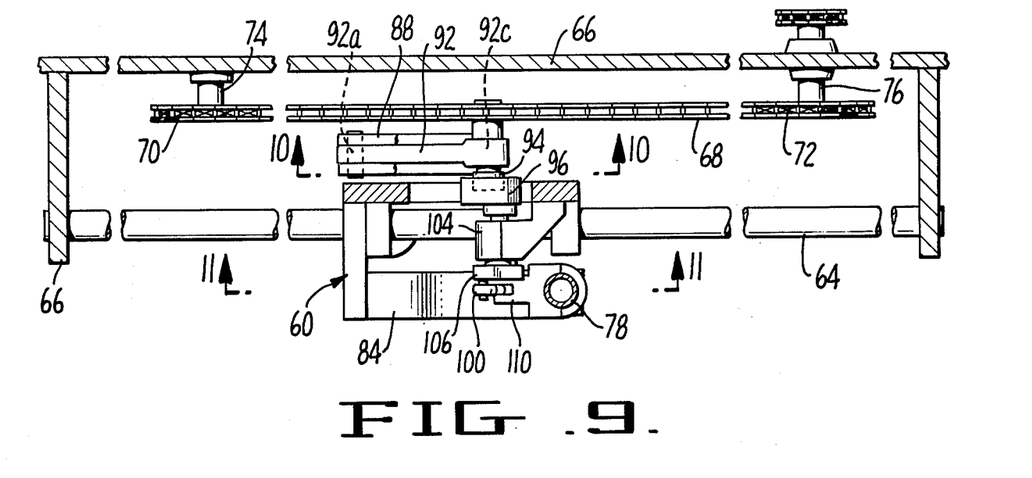
FIG. 9 is a horizontal, sectional view, with portions broken away, taken generally along the lines 9—9 in FIG. 8.
Figure 10:
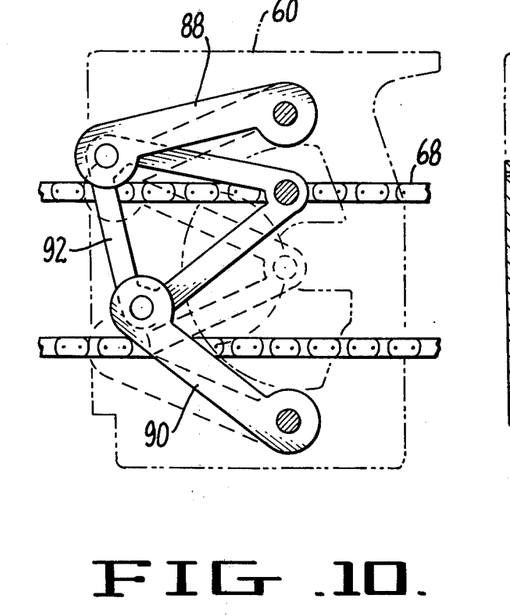
FIG. 10 is an enlarged, vertical view, with portions broken away and in section, taken generally along the lines 10—10 in FIG. 9.

Referring now more particularly to FIGS. 1, 2 and 8, the carriage transfer mechanism of the present invention will be described in greater detail. The carriage transfer mechanism is for the purpose of transporting pieces of fabric located at one spot on a work surface 60 to a second spot linearly spaced from the first spot. Because the piece of fabric is limp and yet must be picked up and put down precisely and with a particular angular orientation with respect to the work surface, it is extremely important that the carriage travel within closely specified tolerances. It is also important that the timing of the movement be absolutely precise since the piece of fabric being picked up will normally have just completed one work station in the garment assembly fabrication process and must be immediately placed at the entrance to a second work station. Any misalignment will result in doubling up of the pieces of fabric or a gap which will cause malfunctions in the remaining garment assembly process.

The carriage transfer mechanism comprises a carriage 60 which travels along a pair of parallel, vertically spaced apart, upper and lower horizontal rods 62 and 64, respectively. The rods are fitted in a mounting frame 66 which is rigidly mounted above the working surface 61. The carriage 60 is slid along the rods 62 and 64 by means of a driving chain 68 trained around two horizontally spaced apart sprocket gears 70 and 72. The sprocket gears 70 and 72 are rotatably mounted on horizontal shafts 74 and 76, respectively. The shafts 74 and 76 are mounted in the frame 66 near the ends of the rods 62 and 64. The carriage 60 supports a vertically extending pipe 78 which is hollow and which is connected at its upper end to a vacuum source by means of a hose 80. The lower end of the pipe 78 is connected to a pickup foot 82 which is hollow and which contains a plurality of vacuum ports on its undersurface (not shown) which adhere to the pieces of fabric when the foot 82 is pressed down on top of the fabric pieces resting on the work surface 61. The pipe 78 is attached to the carriage 60 by means of a pair of generally horizontal, flexible metal straps 84 and 86 which allow vertical movement of the pipe 78 but which prevent the pipe 78 from pivoting about either a horizontal or vertical axis.

The particular manner in which the carriage 60 is attached to the driving chain 68 is quite important since it is highly desirable to only produce a tensional force on the chain 68 in the direction of its travel rather than to produce any force which tends to cause the chain to pull away from its direction of travel. Such undesirable forces cause problems in the bearings of the shafts 74 and 76 or cause the carriage 60 to jam on the support rods 62 or 64. In the carriage transfer mechanism of the present invention a pair of upper and lower connecting bars 88 and 90 are each pivoted at one end to the carriage 60 and at their other ends to the opposite vertices 92a and 92b of an equilateral triangular member 92. The third vertex 92c is rotatably mounted to the driving chain 68. The third vertex 92c includes a projecting member 94 which extends away from the vertex 92c on the side facing away from the chain 68. This projecting member 94 is circular and is captured by a rectangular bracket 96 which forms part of a cranking mechanism 98 rotatably mounted to the carriage 60. The opposite end of the cranking mechanism 98 is connected by means of a pivoted link 100 to the vertical shaft 78.

Figure 14:
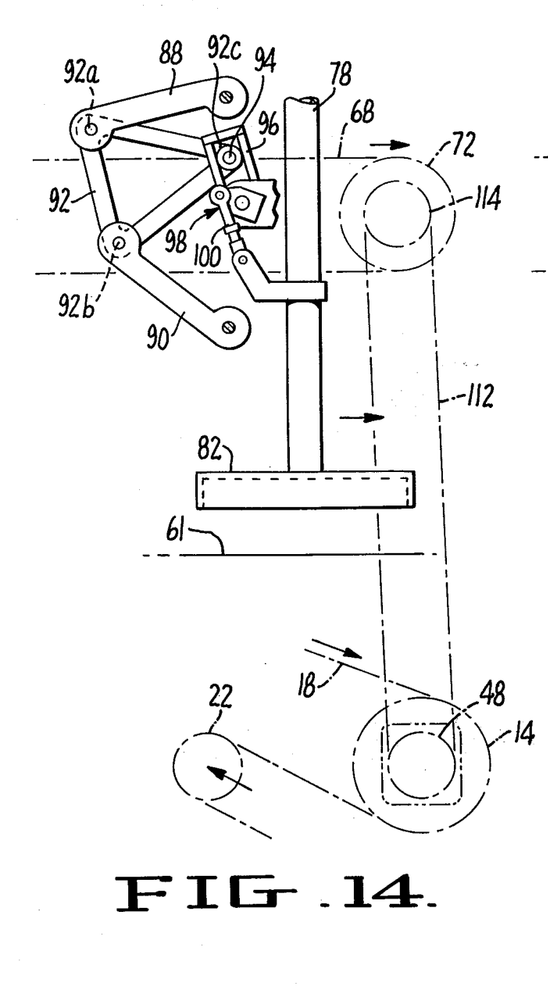
FIGS. 14, 15 and 16 are diagrammatic, vertical views, illustrating the operation of the carriage transfer mechanism according to the invention.
Figure 15:
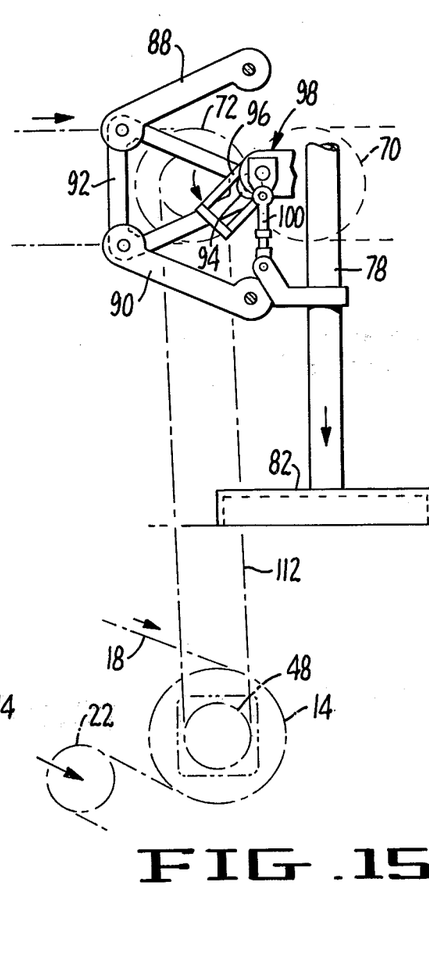
Figure 16:
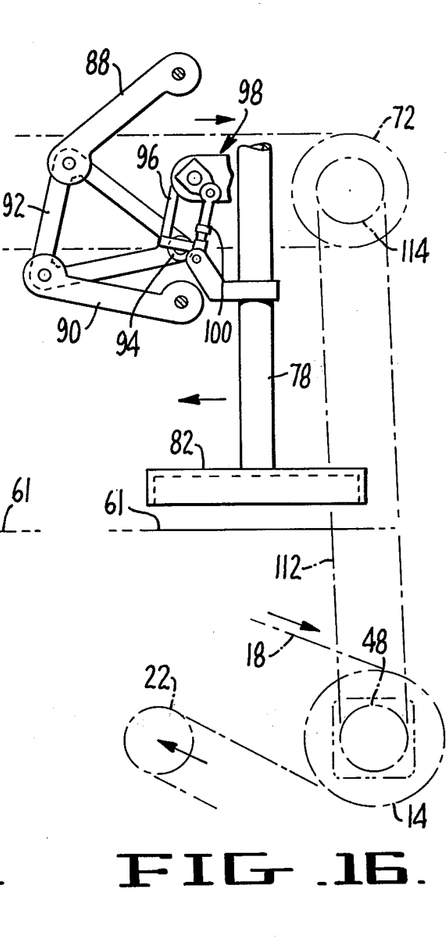

Referring now more particularly to FIGS. 14, 15 and 16 the cranking operation of the carriage transfer mechanism by which the vertical shaft 78 and the vacuum foot 82 are raised and lowered will be described. As the carriage 60 approaches the end of the transfer mechanism at which the sprocket gear 72 is situated, that is, the right end as viewed in the Figures, the crank mechanism 98 is aligned such that the projecting pin 94 engaged in the crank bracket 96 holds the vertical shaft 78 in its raised position. As the vertex 92c of the triangular member 92 passes with the driving chain 68 about the circumference of the sprocket gear 72 the projecting pin 94 rotates the bracket 96 about the cranking axis of the cranking mechanism 98 with the result that the connecting link 100 is rotated downwardly to lower the vacuum foot 82 to be in contact with the work surface 61. Because of the vacuum being drawn through the hollow shaft 78, a fabric workpiece lying on the work surface 61 will be picked up by the vacuum foot 82 as the shaft 78 is raised. The raising of the shaft 78 is accomplished as the projecting pin 94 travels through a complete 180° portion of the circumference of the sprocket gear 72. This causes the bracket 96 to continue through its rotation to crank the connecting link 100 upwardly to raise the vertical shaft 78. In the now raised position, the shaft 78 and the carriage 60 are drawn along the lower extent of the driving chain 68 to the opposite sprocket gear 70 where the above described operation is repeated in reverse to again lower the vertical shaft 78 and the vacuum foot 82 to the work surface 61. At this point the vacuum through the shaft 78 is cut off by a vacuum valve V which may be mechanically or electronically operated so that the fabric piece is released to the work surface 61. As the projecting pin 94 continues around the circumference of the sprocket gear 70 and begins its travel along the upper length of the driving chain 68 the vertical shaft 78 is again raised to its upper position.

Figure 11:
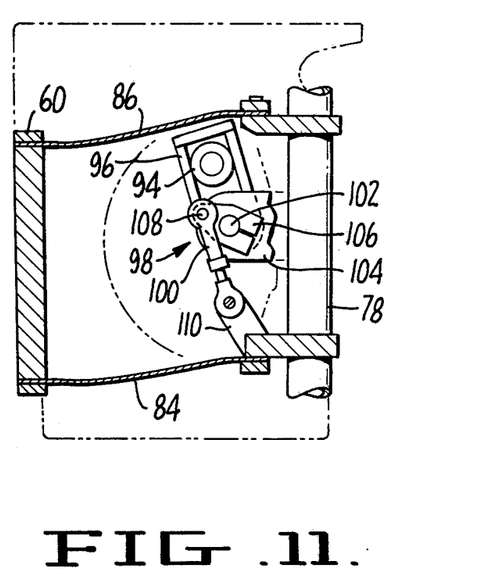
FIG. 11 is an enlarged, vertical view, with portions broken away and in section, taken generally along the lines 11—11 in FIG. 9.

As can best be seen in FIGS. 8 and 11, the cranking mechanism 98 includes the rectangular hollow bracket 96 which captures the projecting pin 94 and is mounted on one end of a shaft 102 which is rotatably mounted in a boss 104 projecting from the carriage 60. A clamp member 106 is mounted on the end of the shaft 102 which is on the opposite side of the boss 104 from the rectangular frame 96. The clamp member 106 includes a projecting pin 108 which engages one end of the connecting link 100 whose other end is pivoted to a bracket 110 mounted on the vertical shaft 78. As the shaft 102 is rotated by the cam following action of the rectangular bracket 96 moved by the projecting pin 94, the clamp member 106 is rotated and exerts a cranking action through the pin 108 on the connecting link 100. It can be appreciated that the synchronization of the lifting of the shaft 78 with the carriage movement can be easily adjusted by the angular orientation of the clamp member 106 with respect to the shaft 102.

The interrelationship between the intermittent drive assembly and the carriage transfer mechanism can be appreciated more fully with respect to FIG. 2 when it is realized that the dwell period of the output gear 48 occurs when the carriage 60 is at either end of the carriage transfer rails 62 and 64. The dwell actually occurs at about the midpoint of the travel of the vertex 92c about the sprocket gears 72 and 70. It is at this point that the vacuum foot 82 is just making contact with the work surface 61. The sprocket gear 72 is connected to the output gear 48 by means of a driving chain 112 trained about a reduced sprocket gear 114 mounted on the same shaft as the sprocket gear 72.

Figure 12:
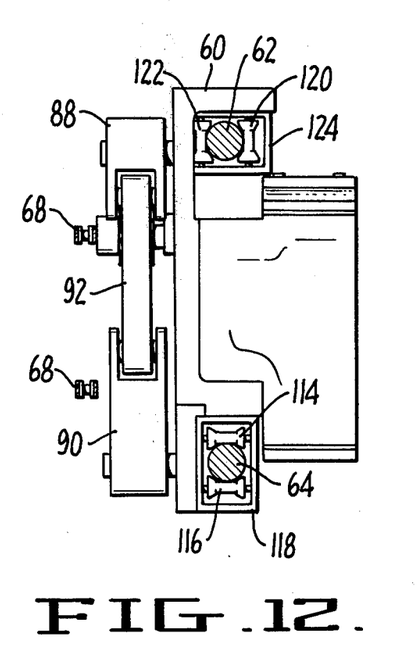
FIG. 12 is a vertical, end view, with portions broken away and in section, taken generally along the lines 12—12 in FIG. 8.
Figure 13:
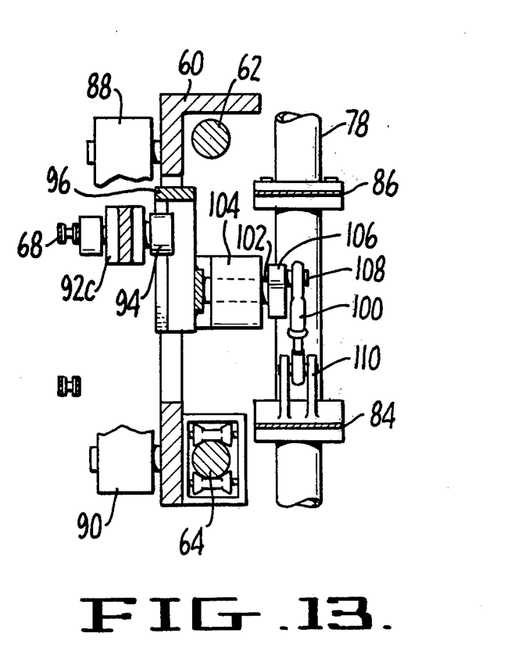
FIG. 13 is a vertical view, in section and with portions broken away, taken generally along the lines 13—13 in FIG. 8.

Referring now more particularly to FIGS. 12 and 13 the carriage 60 is vertically supported on the rod 64 by means of a pair of upper and lower spaced apart rollers 114 and 116, respectively, which vertically straddle the lower rod 64 and are mounted in a bracket 118 attached to the carriage 60. To horizontally stabilize the carriage 60 a pair of right and left rollers 120 and 122, respectively, mounted in a bracket 124 attached to the carriage 60 straddle the upper rod 62.

Figure 17:
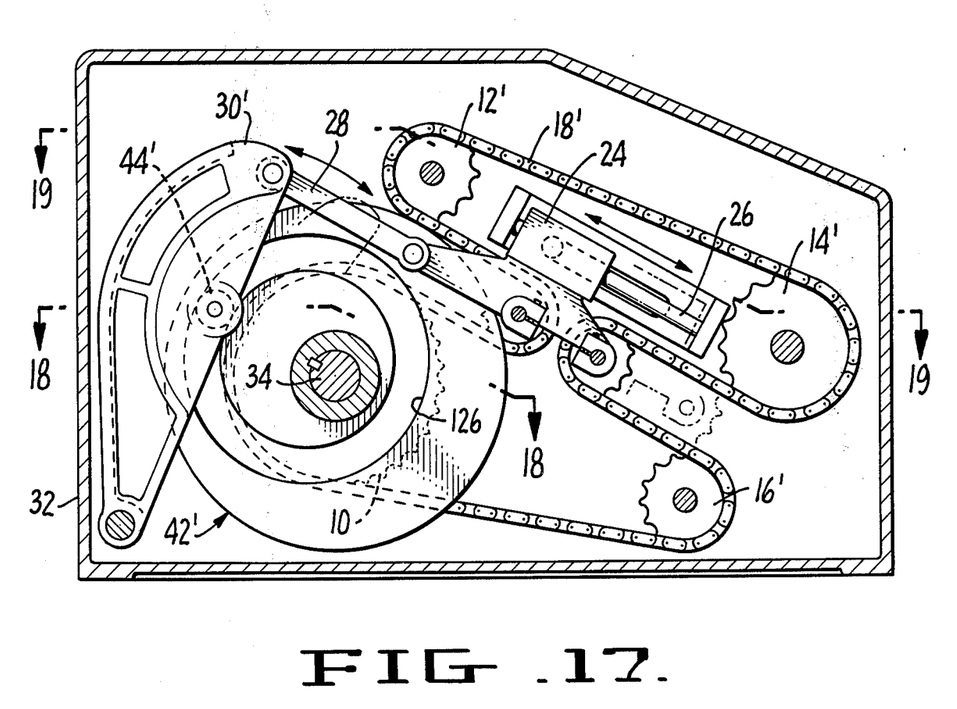
FIG. 17 is an enlarged vertical view, in section, and with portions broken away, of a second embodiment of an intermittent drive assembly according to the invention.
Figure 18:
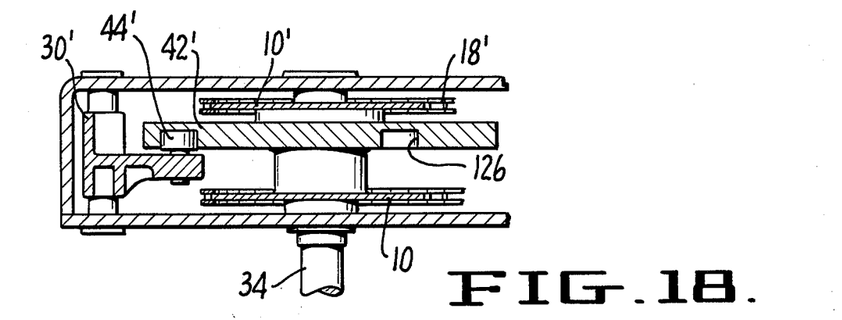
FIG. 18 is an enlarged horizontal, sectional view, and with portions broken away, taken generally along the lines 18—18 of FIG. 17.
Figure 19:
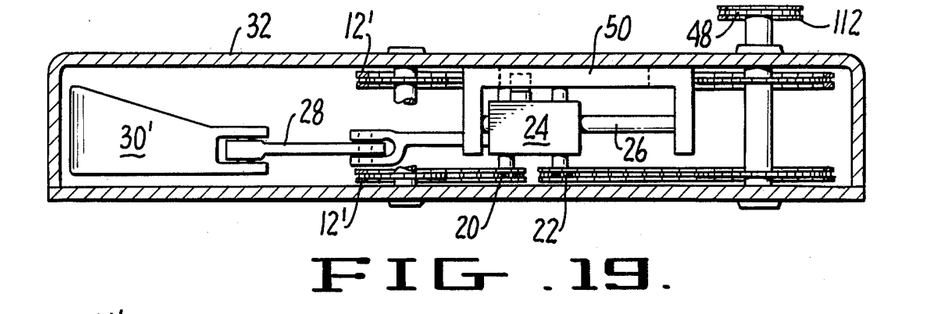
FIG. 19 is an enlarged horizontal, sectional view, taken generally along the lines 19—19 of FIG. 17.

Referring now more particularly to FIGS. 17, 18 and 19 an alternative embodiment for the intermittent drive assembly is illustrated, which is fundamentally the same as the assembly depicted and described above, with the exception of the cam 42 and the cam follower 44. Therefore all of the same reference numerals have been utilized with the exception of the cam and cam follower, which has been given the same reference numerals primed. As can best be seen in FIGS. 17 and 18, the circular cam 42' includes a groove 126 in which the cam follower roller 44' mounted on the cam follower lever arm 30' is captured. The cam follower lever 30', as in the first embodiment, is pivoted at one end to the case 32 and at its opposite end to the connecting link 28 whose other end is connected to the sliding block 24. In this manner the spring 46 is eliminated and more positive to and fro action of the block 24 is achieved.

While in the above described embodiments the intermittent drive assembly has been particularly illustrated with reference to a carriage transfer mechanism, it should be apparent that in other embodiments the intermittent drive assembly may be utilized to drive other portions of the garment assembly manufacturing apparatus. Furthermore the particular details of the carriage transfer mechanism are illustrative only and in other embodiments other arrangements may be utilized. For example, in some embodiments the vacuum foot 82 is comprised of a pair of feet spaced apart on a long plenum bar attached to the vertical shaft 78. This bar is of a length approximately equal to the distance of travel of the carriage 60 so that the resultant operation is that both feet pick up pieces of fabric material simultaneously and release them at the opposite end of the carriage travel. This places at least one of the pieces of fabric in position to be picked up by the other foot mounted on the bar on the return trip of the carriage. In still other embodiments the vacuum foot 82 is replaced by a cam operated clamping member.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. An intermittent drive assembly comprising first, second, third and fourth rotative members, rotative support means for separately mounting the first, second, third and fourth rotative members in a spaced apart generally rectangular configuration, an endless flexible drive member trained around the first, second, third and fourth rotative members in a manner such that the flexible drive member passes from the first, to the second, to the third, and to the fourth rotative members in that order, with slack loops in the flexible drive member between the first and second rotative members and between the third and fourth rotative members, movable idler means for controlling the length of the slack loops in the endless drive member between the first and second rotative members and between the third and fourth rotative members in an inverse fashion, such that when the slack in the loop between the first and second rotative members is increased, the slack between the third and fourth rotative members is decreased, and vice versa, and means for moving the movable idler members together for controlling the length of the respective loops of slack in the endless drive member, the rotative support for one of the first or fourth rotative members constituting a driving input and the rotative support for one of the second or third rotative members constituting the driving output of the assembly in combination with a transfer device comprising a pair of parallel, spaced apart, horizontal rails, a frame for rigidly mounting the rails, a carriage mounted to ride on the rails, an endless driving member connected to be driven by the output of the intermittent drive assembly, rotatable means mounted at the opposite ends of the rails for rotatably supporting the driving member, and means for attaching the carriage to the endless driving member, the attaching means including a pair of connecting bars and an equilateral, triangular member, the connecting bars being pivoted at one end to the carriage and at their other ends to opposite vertices of the triangular member, the triangular member having its remaining vertex pivotally attached to the driving chain.

2. The combination as recited in claim 1 further comprising a projecting pin from the vertex of the triangular member which is attached to the endless driving member, a rectangular bracket for capturing the projecting pin, a horizontal shaft carried on the carriage and with the bracket mounted at one end of the horizontal shaft, a cranking pin mounted on the other end of the horizontal shaft, a vertical shaft carried by the carriage, and a connecting link between the vertical shaft and the cranking pin mounted on the end of the horizontal shaft, and means for mounting the vertical shaft on the carriage so that the vertical shaft may be moved vertically from one position to another by means of the cranking action of the bracket and the horizontal shaft.

3. The combination as recited in claim 2, wherein the vertical shaft is hollow, and further comprising a vacuum foot attached to the lower end of the vertical shaft for adhering to work pieces when pressed against them and means for applying a vacuum to the upper end of the hollow shaft.

* * * * *